Aug. 30, 1938. S. M. GODFREY 2,128,607
FISH-SCALING MACHINE
Filed Aug. 2, 1937 2 Sheets-Sheet 2
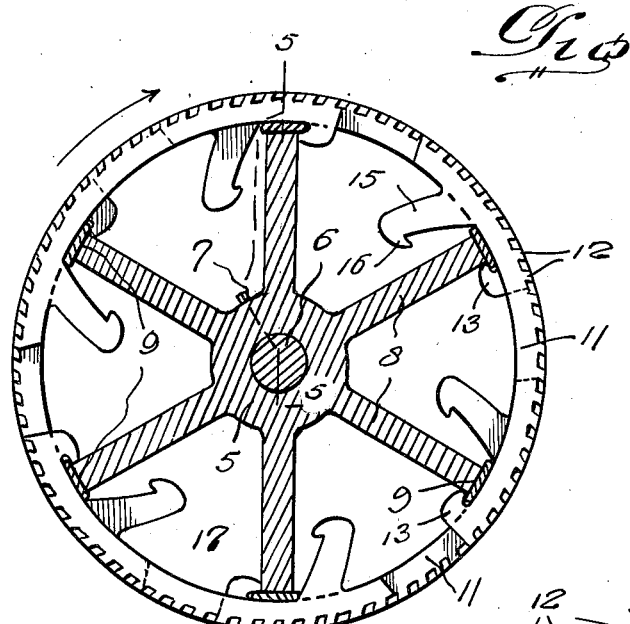
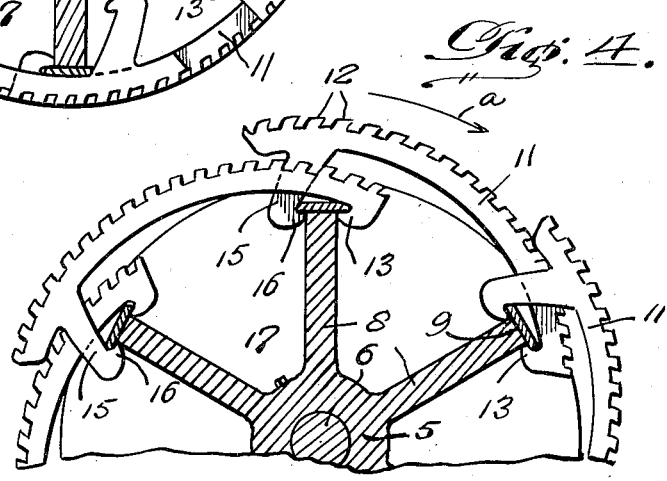
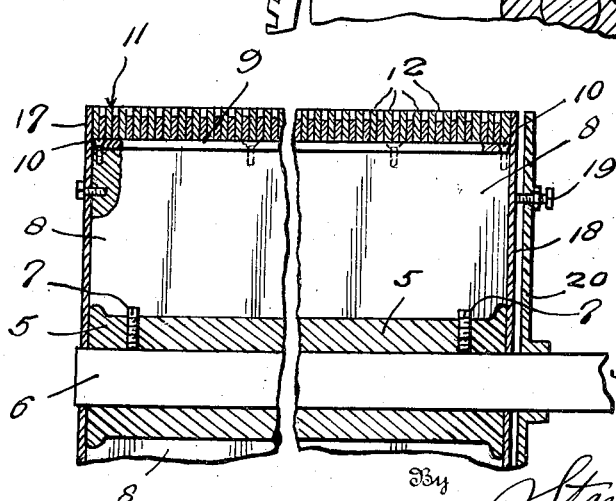
Inventor
Samuel M. Godfrey,
By J. Stanley Burch
Attorney Patented Aug. 30, 1938

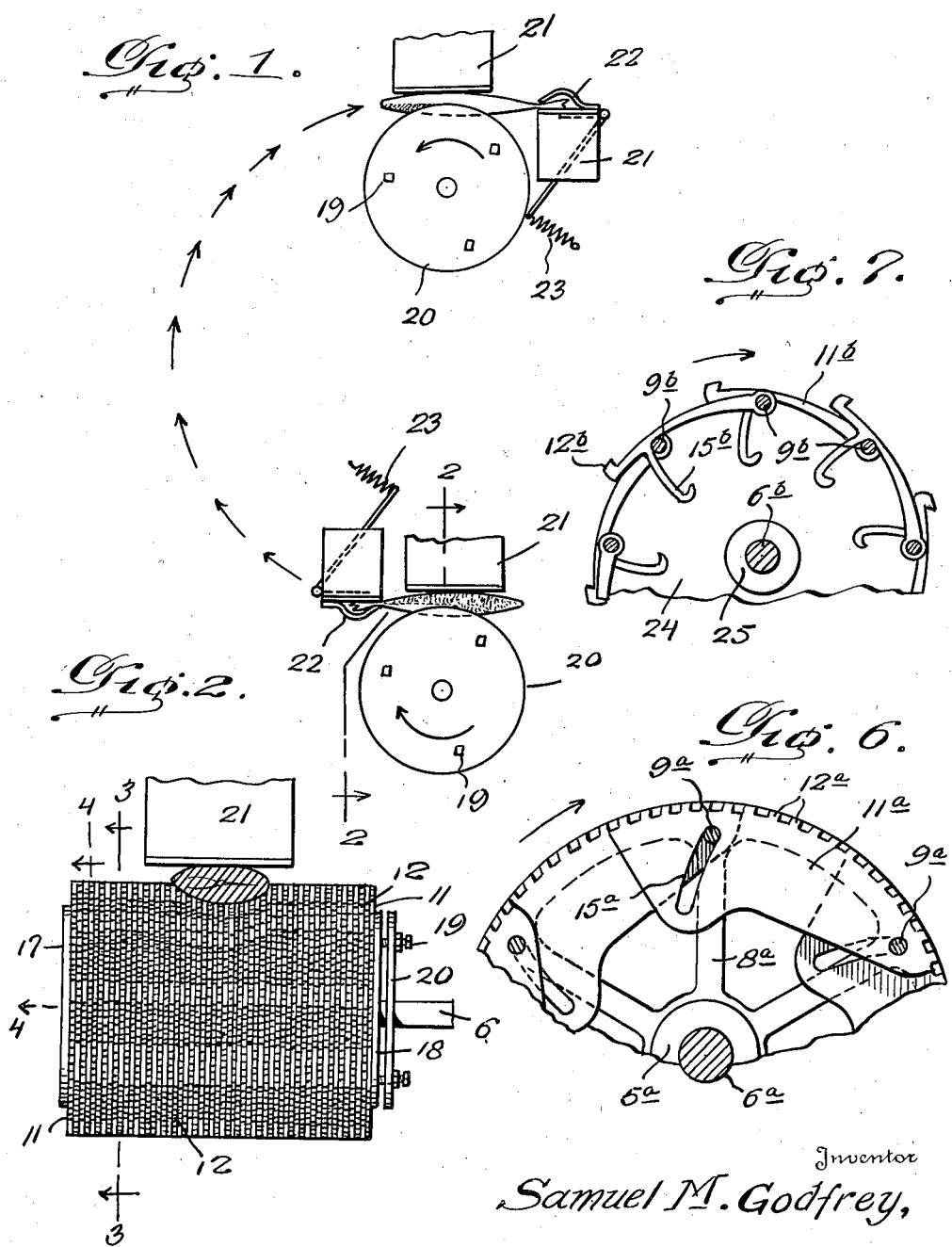

2,128,607

UNITED STATES PATENT OFFICE 2,128,607

FISH-SCALING MACHINE

Samuel M. Godfrey, Sharon, Pa.

Application August 2, 1937, Serial No. 157,057

5 Claims. (Cl. 17—5)

This invention relates to fish scaling machines, and the primary object of the present invention is to provide a machine of this kind having a novel form and arrangement of rotary cylindrical scaling drums or rollers.

A more particular object of the present invention is to provide an improved construction of scaling drum or roller for fish scaling machines, said scaling roller embodying a circular series of longitudinal rows of circumferentially extending scaling blades mounted for free outward movement under the action of centrifugal force generated upon rotation of the scaling drum, whereby said blades may yieldingly engage and conform to the transverse contour of the side of a fish presented to said scaling drum, for effectively removing the scales therefrom without damage to the body or flesh of the fish.

A further object of the present invention is to provide a scaling drum of the above kind in which the scaling blades are of arcuate form and extend circumferentially of the scaling drum, said scaling blades being pivotally mounted at corresponding ends, and means being provided at the other corresponding ends of the blades for limiting the outward swinging thereof.

Still another object of the present invention is to provide a scaling drum of the above kind in which the free or trailing ends of the blades of each row are arranged between the pivoted ends of the blades of the next succeeding row, and wherein one and the same member which forms part of the means for limiting the outward swinging of the free or trailing ends of the blades of each row constitute part of the means for pivotally mounting the leading ends of the blades of the next adjacent row.

Other objects and features of the present invention will become apparent from the following description when considered in connection with the accompanying drawings, and the present invention consists in the novel form, combination and arrangement of parts hereinafter more fully described, shown in said drawings and claimed.

In the drawings:

Figure 1 is a somewhat diagrammatic elevational view illustrating two scaling drums constructed in accordance with the present invention and the manner of conveying a fish past and in engagement with said scaling drums to effect removal of the scales from both sides of the fish.

Figure 2 is a sectional view on line 2—2 of Figure 1 with the adjacent scaling drum in elevation and the scaling blades expanded under the action of centrifugal force.

Figure 3 is an enlarged section of the scaling drum shown in Figure 2 taken on the plane of line 3—3 of Figure 2, but with the scaling blades in contracted position.

Figure 4 is an enlarged fragmentary section on line 4—4 of Figure 2.

Figure 5 is a fragmentary longitudinal section on line 5—5 of Figure 3.

Figure 6 is a view similar to Figure 4 of a modified form of construction for the scaling drum, with the scaling blades contracted; and Figure 7 is a view similar to Figure 6 of a still further modification of the scaling drum.

Referring in detail to the drawings, the embodiment of the scaling drum shown in Figures 2 to 5 inclusive includes a supporting member having a hub 5 adapted to be secured upon a supporting and driving shaft 6 by means of set screws 7, and provided with uniformly spaced radial webs 8. The hub of this supporting member has the radial longitudinal webs 8 rigid therewith, and longitudinal strips or flat bars 9 are secured on the outer edges of the webs 8 by means of screws 10 having their heads countersunk in said strips or bars 9. A rigid support is thus formed of the desired length and of general cylindrical form for receiving the scaling blades 11.

The blades 11 are of general arcuate form and provided on their outer arcuate edges with teeth 12 inclined tangentially of the scaling drum in the direction towards which the drum is adapted to be rotated in use, so as to effectively engage and remove the fish scales. Blades 11 are arranged in longitudinal rows with the opposite ends of the blades in each row arranged between the adjacent ends of the blades of the next adjacent rows. The leading ends of the blades of each row are provided with inwardly extending hook-shaped members 13 arranged to engage over the leading edge of one strip or bar member 14 to pivotally connect the blades thereto, and such blades have inwardly extending arms 15 at their free or trailing ends provided with hook-shaped inner ends 16 arranged to cooperate with the trailing edge of the next succeeding strip or bar 9, to limit the outward swinging movement of said free or trailing ends of the blades. It will thus be seen that the hooked ends at 13 of each row of blades cooperates with a bar 9 to pivotally mount said row of blades, and this same bar 9 cooperates with the hooked arms 15, 16 of the blades of the preceding row for limiting the outward swinging movement of the trailing ends of said blades of the preceding row. While the blades are arranged in contiguous relation at their overlapping ends, they are not compacted tightly and are therefore free to swing outwardly under the action of centrifugal force created by rotation of the scaling drum. The direction of rotation is indicated by the arrow $a$ and the leading ends of the blades are the pivoted ends thereof. In order to maintain the blades in properly compacted relation, disks 17 and 18 are arranged on the shaft 6 with the marginal portions of said disks engaging the endmost blades outwardly of the webs 8 and bars 9. The disk 18 may be forced toward the blades by means of set screws 19 threaded through another disk 20 fixed upon the shaft 6. The adjustment of set screws 19 is such as to compact the blades 11 without setting up such frictional engagement of said blades with each other as would prevent free outward swinging thereof under the action of centrifugal force.

A machine employing the present type of scaling drum would involve two of them rotated in opposite directions as shown in Figure 1 in proximity to suitable guide elements 21, the fish being suitably conveyed over the lower scaling drum and under the adjacent guide member 21 so as to remove the scales from one side of the fish. The fish is then conveyed over the other scaling drum so as to present the other side of the fish to the latter and remove the scales from the latter side of the fish. The conveying means may be of any suitable construction embodying clamps 22 arranged to engage the tail of the fish for drawing it between the scaling drums 20 and the associated guides 21. The guides 21 may be adjusted to properly maintain the fish into engagement with the scaling blades, and the clamps 22 may have releasable jaws closed by spring means 23 operable to open the jaws and release the fish after being scaled. As this construction of conveyor forms no specific part of the present invention, it is only diagrammatically illustrated. The essential considerations are that two scaling drums are employed which are rotated in opposite directions as well as in directions opposed to the direction of travel of the fish past and into engagement with the scaling rollers. The blades will of course swing outwardly under the influence of centrifugal force so as to engage the presented side of the fish and conform to the contour of the latter as clearly shown in Figure 2.

In the modified form of construction shown in Figure 6, the scaling drum is constructed exactly like that of Figures 2 to 5 inclusive except that spoked end supporting members are provided, and the bars $9a$ which connect the spokes $8a$ of the end supporting members are of cylindrical form. Also, the scaling blades $11a$ have circular openings at their leading ends to pivotally receive one of the bars $9a$, and are provided at their trailing ends with arcuate elongated slots $15a$ receiving the next succeeding bar $9a$ for permitting limited outward swinging movement of the trailing ends of the blades. In other words, this modification simply provides for modified form of blades involving an alternate manner of pivoting and limiting the swinging movement of the blades. In this form, the teeth of the blades are indicated at $12a$, the shaft at $6a$, and the hubs of the spoked end supporting members at $5a$.

A still further modification is shown in Figure 7 in which the arcuate blades $11b$ are pivoted at their leading ends on cylindrical bars $9b$, but have inwardly projecting hooked arms $15b$ cooperating with the next succeeding bar $9b$ for limiting the outward swinging movement of the trailing ends of the blades. Also, as shown in this figure, each blade may only be provided with a single outwardly projecting tooth $12b$ at its trailing end. In all forms shown, however, the blades of each row have their pivoted and trailing ends arranged between the blades of the next adjacent rows, and the rod or bar which forms part of means for limiting the outward swinging movement of the trailing ends of each row constitutes part of the means for pivotally mounting the leading ends of the next succeeding row of blades. In this form of Figure 7, however, the end supports may simply consist of disks 24 having hubs 25 and secured on the shaft $6b$ with the rods or bars $9b$ connecting them at their margins.

The present form or type of scaling drum is very efficient in operation and has no damaging effect upon the body or flesh of the fish being scaled, the blades being yieldable so freely as to at all times engage the fish with a light pressure such as cannot be had by the use of blades expanded by the use of springs or by the use of blades which themselves possess resiliency or yielding qualities.

From the foregoing description, it is believed that the construction and operation as well as the advantages of the present invention will be readily understood and appreciated by those skilled in the art. While the present toothed drum is primarily intended and described for use in fish scaling, it is obvious that the same may be used for any other purpose where it is desired to clean an irregular surface. Further minor changes and specific modifications than shown and described may be resorted to without departing from the spirit and scope of the invention as claimed.

What I claim as new is:

1. In a fish scaling machine, a scaling roller having a circular series of longitudinal rows of scaling blades freely mounted at corresponding ends for outward swinging movement under the influence of centrifugal force generated by rotation of the scaling drum, means at the trailing ends of said blades for limiting the outward swinging movement thereof, the blades of each row having their ends interposed between the ends of the blades of adjacent rows, and a member common to the means for mounting the leading ends of each row of blades and the means for limiting the outward swinging movement of the trailing ends of the blades of the next preceding row of blades.

2. A scaling drum comprising end supporting members, uniformly spaced peripheral longitudinal bars connecting said end supporting members, a circular series of longitudinal rows of arcuate scaling blades, means pivotally connecting the leading ends of each row of blades to one of said bars, and means cooperating with another of said bars for limiting the outward swinging movement of the trailing ends of said row of blades.

3. A scaling drum comprising a support composed of end members and spaced longitudinal bars connecting said end members, longitudinal rows of arcuate scaling blades pivoted at corresponding ends to said bars and extending circumferentially, and means carried by said blades and engageable with said bars for limiting the outward swinging movement of said blades at their trailing ends.

4. A scaling drum comprising a support including uniformly spaced longitudinal bars, a circular series of longitudinal rows of scaling blades, means pivotally mounting said blades at their leading ends for free outward movement under the action of centrifugal force, and inwardly extending arms on the trailing ends of said blades having hooked inner ends arranged to engage said bars for limiting the outward movement of said blades.

5. A scaling drum comprising a support including uniformly spaced longitudinal bars, a circular series of longitudinal rows of scaling blades, hooked-shaped members on the leading ends of each row of blades engaging one of said bars for pivotally mounting said blades for free outward movement under the action of centrifugal force, and inwardly extending arms on the trailing ends of said blades having hooked inner ends arranged to engage another of said bars for limiting the outward movement of said blades.

SAMUEL M. GODFREY.